Patented Nov. 20, 1951

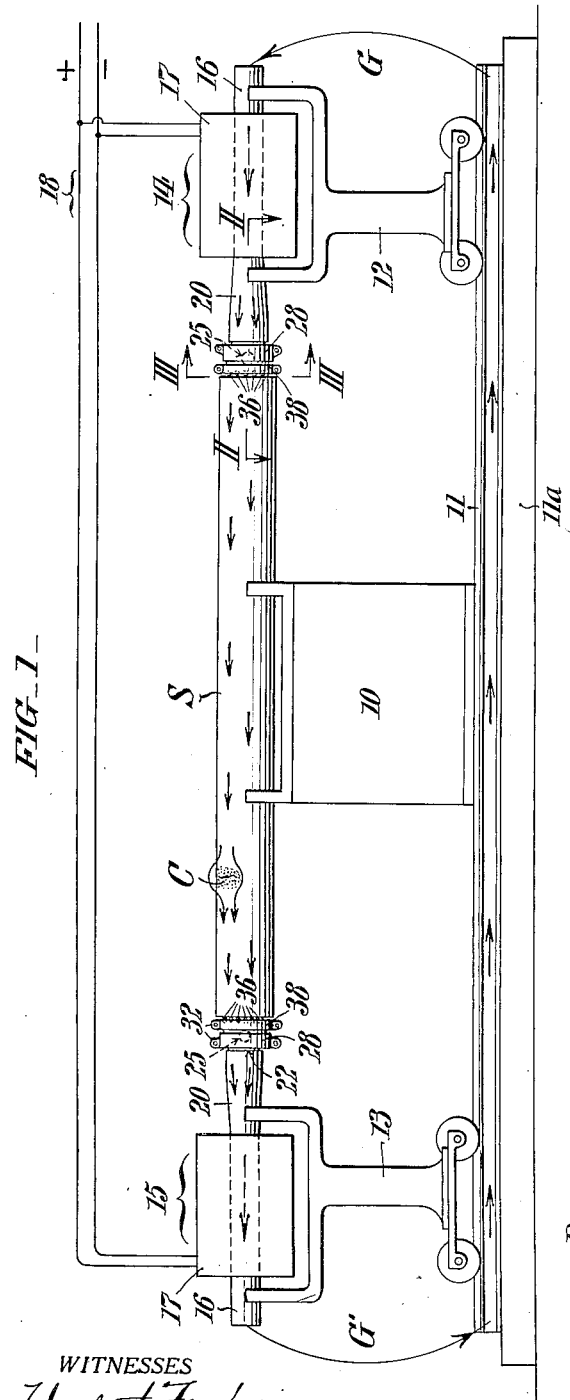

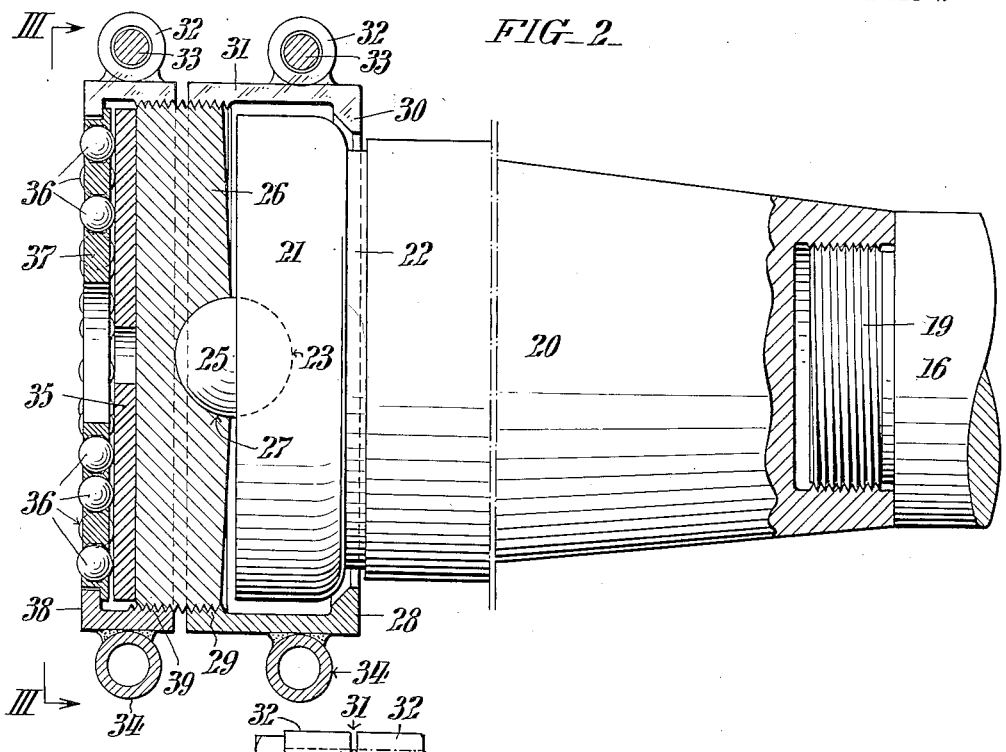
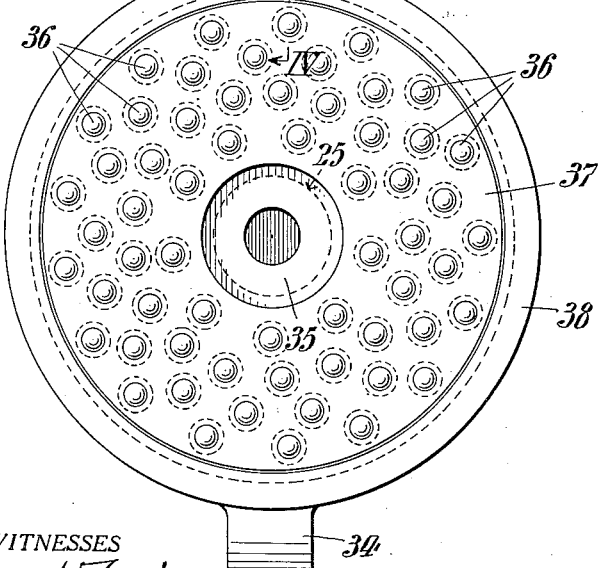
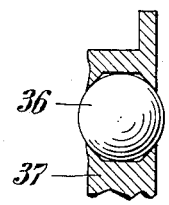

2,575,811

UNITED STATES PATENT OFFICE 2,575,811

MAGNETIC TESTING APPARATUS

Karl E. Hofammann, Altoona, and Sylvester M. Viele, Swarthmore, Pa.

Application January 3, 1947, Serial No. 720,010

18 Claims. (Cl. 175—183)

1

This invention relates to apparatus useful in carrying out magnetizing operations on various objects for different purposes, for example, on railway equipment parts such as axles, shafts, connecting rods, rails, etc., to enable detection of cracks or fissures at or immediately below their surfaces.

The chief aim of our invention is to make it possible to traverse magnetic flux through various objects from end to end without attendant leakage of flux laterally through their lengthwise surfaces at any point particularly at their end portions. This desideratum is realized in practice as hereinafter more fully disclosed, through provision of a relatively simple and inexpensive apparatus which, in its most elemental form, includes a pair of electro-magnets arranged beyond the ends of the object to be magnetized, with their cores substantially in axial-alignment with the object, and energized so that the magnetic forces produced by them are additive and applied with the same degree and gradient rate inside and outside the surface of the object to determine traverse of flux substantially uniform in amount longitudinally through the object from end to end as aforesaid; and which further includes a magnetic yoke designed to provide a return path of high reluctance for the flux and to confine the magnetic leakage in equal amounts to the outer ends of the magnet cores. Our improved method of magnetization creates a maximum difference in intensity of a magnetic field at a crack in the object under test as compared with the field existing at the surface areas adjacent thereto, and thus affords a more distinct and positive indication of the defect than is attainable with apparatus and methods heretofore devised for the purpose.

Other aims and attendant advantages will appear from the following detailed description of the attached drawings, wherein Fig. 1 is a view in side elevation of a magnetizing apparatus conveniently embodying our invention.

Fig. 2 is a fragmentary detail view partly in elevation and partly in axial section taken as indicated by the angled arrows II—II in Fig. 1 and drawn to a larger scale.

Fig. 3 is a view in end elevation looking as indicated by the angled arrows III—III in Figs. 1 and 2.

Fig. 4 is a fragmentary detail view taken as indicated by the angled arrows IV—IV in Fig. 3 and drawn to a still larger scale; and Fig. 5 is a diagram of the magneto-motive forces applied and consumed in the magnetic flux circuit in making a test with the apparatus.

In the form herein illustrated, our improved magnetizing apparatus includes a standard 10 for sustaining, in horizontal position, an object S to be magnetized, which latter may for example be a railway equipment axle. Guided for rectilinear movement relative to the central standard 10 on a track rail or rails 11 of steel or other magnetizable material, are wheeled end carriages 12 and 13 which, like said standard, are constructed from non-magnetic material. As shown in Fig. 1, the rails 11 are supported on a massive bed 11a also of steel or other magnetic material. Mounted on the carriages 12 and 13 are similar electro magnets 14 and 15 respectively, each having a core piece 16 which is surrounded by a coil 17 and which extends a substantial distance beyond each end of the coil, the extent of projection and the total surface area of the inner end portion of each core piece being greater than that of the outer end portion. These magnets 14 and 15 are preferably of equal power and have their coils 17 so connected to a current supply line, indicated at 18, as to produce magneto-motive forces which are additive in their effect. In practice the standard 10 and/or the carriages 12 and 13 are made so as to be vertically adjustable in order that the object S may be axially aligned with the magnets 14 and 15, or vice versa.

As instanced in Fig. 2, each magnet core piece 16 has a diametrically reduced threaded end portion 19 onto which is screwed an outwardly-flaring or tapered separable extension 20 of steel with a terminal enlargement or head 21, whereof the end face area is somewhat less than the area of the corresponding end face of the test piece S, and a circumferential groove 22 immediately behind said head. Centrally of its face, the head 21 has a hemispherical seat 23 for a ball 25 of hardened steel, and associated with said head is a swivel disk 26 whereof the opposing end face is somewhat beveled and likewise provided centrally with a substantially hemispherical seat 27 for said ball. Surrounding the head 21 is a keeper annulus or ring 28 of steel or the like which is threadedly engaged with the disk 26 at 29 and which has an inwardly-directed circumferential flange 30 projecting into the groove of the core extension 20. As best shown in Fig. 3, the retaining annulus or ring 28 is split at 31 and there provided with brazed-on lug projections 32 of non-magnetic material through which the shank of a headed clamp screw 33 of like material passes. The additional lug at 34 serves, with the lugs 32, as a means for engagement by a spanner wrench in applying or removing the annulus. Abutting the disk 26 is an axially-apertured flat circular washer plate 35 of hardened steel against the outer face of which bear spaced multiple balls 36 of relatively small diameter and likewise of steel, more or less evenly distributed over the area of a retaining disk 37. As shown, the thickness of the retaining disk 37 is considerably less than the diameter of the balls 36 so that the latter will have point contact only with the washer as shown in Fig. 2, and with the contiguous end face of the object S as shown in Fig. 1. Referring again to Fig. 2, it will be seen that the ball retainer 37 is held in place in the assemblage by another keeper ring or annulus 38 which is generally similar to, but somewhat narrower than, the keeper ring or annulus 28 and which likewise has threaded engagement with the swivel disk 26 at 39. A less desirable radial roller or any other anti-friction type bearing may be submitted to obtain the desired ability for turning the object without requiring the magnets to be de-energized.

From the foregoing it will be seen that the flared prolonged inner end portions 20 of the magnet cores form, with the object S, a low reluctance path for the flux, while the element 11a and the air gaps G and G' between the ends of said element and the small diameter outer ends of the magnet cores form a high reluctance return path for the flux.

In a test, the object S is mounted on the standard 10, whereupon the carriages 12 and 13 are brought up until the small balls 36 associated with the cores 16 of the magnets 14 and 15 bear fully against the opposite end faces of said object. In this connection it is to be noted that the large swivel balls 25 will allow self-adjustment of the disks 26 to compensate for any off-squareness of the ends of the object. Thus, the junction contacts between the object and the cores of the electro-magnets are made through magnetic anti friction thrust bearings composed of the steel balls 36 which prevent "freezing" under the effect of the magnetic influence and permit the object to be turned about its axis during the testing.

With this preparation, the specimen S is magnetized by energizing the coils 14 and 15 which establish a magnetic flux through the magnet cores 16 and the flared extensions 20 of the latter, the object, the air gaps G and G' and the magnetic yoke 11, 11a, said coils 14 and 15 being wound and connected to produce magneto-motive forces in the same direction.

Considering the two halves of the total flux path at their junctions in the vertical plane passing through the center of the specimen and the center of the yoke, the magneto motive force is approximately equal at their junctions, consequently there is no difference in force between them and hence no lateral flux flow in this plane. If the plane considered is moved laterally in either direction along the specimen and the yoke, the magneto motive force drop from point to point is small, the difference of force in the two paths is small, and the flux in the plane between the two paths will be small until the plane passes beyond the center of the energizing coil and the gaps G and G' effect the flux distribution. The very high reluctance of gaps G and G' limits and stabilizes the total flux passing longitudinally through the specimen. These high reluctance gaps could be symmetrically arranged in the flux loop between the magnets remote from the object at locations other than shown, as for instance, at each side of the vertical central plane of the device.

It is to be noted that the flux path parallel with and/or surrounding the object is shunted by the path through the object which determines the magneto motive force gradient in the path surrounding the object.

All being now in readiness, the top portion of the object S is dusted with powdered iron or other comminuted magnetic material which is thereupon wetted by a gently applied fluid such as kerosene or carbon tetrachloride. The flow of the fluid will wash off the powdered iron from the areas where it is not held by a magnetic field external to the surface of the specimen S. Any magnetic flux other than that at the crack having components at right angles to the surface of the object S would be detrimental to the sensitivity of the device and is avoided through our invention as will be readily understood. If a crack is present, the reluctance of the local path is substantially increased, with the result that the crack is by-passed and bridged by part of the longitudinal flux through the surface of S. This local magnetic field holds the magnetic particles and outlines the crack. In practice the magnetic particles may be made reflective, and reflected light used to augment the indications. Any cracks found are marked. The object is then rotated to expose a new surface on top and the process repeated until the entire surface is tested, after which the magnets are de-energized, and the object removed. This process is repeated for each succeeding object to be tested. The flaring extensions 20 of the magnet cores 16 are preferably designed as shown so that the areas of their end faces do not exceed those of the end faces of the object, and this is also true of the annuli 28 and 38. Therefore, no appreciable flux leakage will take place at these regions to divert flow from a true longitudinal path and through the end portions of the object, the lugs on said annuli having no effect upon the flux by reason of being made from non-magnetic material. When required for the magnetization of objects of larger or smaller diameters, such for example, as locomotive pistons, side or main rods, etc., the magnet core extensions 20 may be replaced by others differently shaped or proportioned. With the apparatus set up as shown, either direct or alternating current may be used to energize the coils 17 of the electro-magnets 14 and 15.

By virtue of the described construction and arrangement of the component parts of the apparatus, the two magnets 14 and 15, the rail 11 and base 11a which provide a parallel return path for the flux, and the gaps at G, G' may be regarded as constituting a magnetic yoke.

Horizontally, the diagram of Fig. 5 is proportional to the apparatus as developed for magnetizing railroad equipment axles; while vertically, it is roughly proportional to the magneto-motive forces involved. All the lettered lines designate magneto-motive force drops due to magnetic flux except one at each end which is the resultant of the externally applied force and the drop due to flux in the coil cores. Point O is assumed as a convenient starting and closing point of either the whole or of one half of the diagram. Line O—A represents the drop within the object S, and lines A—B the drop through the air gap at the junction of the object with the apparatus and the thrust bearing at 37 which permits rotation of the object, and also the drop through the air gap inherent in the ball and socket joint at 25. Line B—C represents the drop through the projection of the magnet core extending between such core and the specimen. Line C—D represents the difference of the magneto-motive forces as a source for one half of the system and the drop through the magnet core. Line D—E represents the magneto-motive force drop in the air gaps G which separate the magnetic yokes 11, 11a from that part of the flux circuit consisting of the cores 16, the extensions 20 and the object S. Line E—O represents the drop in the magnetic yoke 11, 11a previously defined, the diagram closing at O which was taken as the starting point. The direction of flux producing the drops and the flux source as indicated by the lines O—A, A—B, B—C and C—D are in axial alignment, D—E being roughly at right angles to O—A, A—B, and B—C, and O—E approaches a position 180° from O—A. The total flux is largely controlled by the reluctance of the two large gaps G and G', in the magnetic circuit. Such flux as traverses these gaps passes through the object S and the adjacent structure to the transverse center of the coils 14 and 15 with very little magneto-motive force drop; neither is there a relatively large drop due to the flux traversing the yoke 11, 11a. This results in a small difference of magneto-motive force between the object S and the yoke 11, 11a as indicated in the diagram of Fig. 5, by the small divergence of the two lines O—A and O—E which represent the drops in the object and in the yoke, constitutes a relationship of parts intended to limit the amount of magnetic flux interchange through all the surfaces of the object except its end surfaces. It is to be particularly noted that the line C—D is intersected by the line O—E and that it would be intersected by prolongation of line O—A, i. e., the source of the magneto-motive force for each half of the apparatus supplies energy at magnetic potentials above and below the potentials of both magnetized metallic legs of the apparatus. This results in smaller differences of magneto-motive force between parts of the same end of the apparatus. There is a difference in magneto-motive force between the points A and A', this difference being applied over two parallel paths, one through the transverse sections of the object, and the other outside but adjacent the surface of said object. These two paths being coextensive and individually homogeneous, with any material inequalities in sections of the object as a necessary limitation on uniformity of the paths, there exists only a relatively small interchange of flux between the two parallel paths, or stated in other words, there is a minimum of flux external to the non-cracked surface of the object. Large differences in cross section of the object would introduce inequalities in the magnetic paths and cause some interchange of flux between the two paths which, except for such inequalities, would be relatively free of such interchange. It is desirable to limit the total flux so that magnetic saturations are not approached in any section of the object. Minimization of the interchange between the two paths is highly important since upon the control of this condition depends the ability to discriminate between cracked and non-cracked areas.

Having thus described our invention, we claim:

1. In testing apparatus for flaw detection in elongate magnetizable objects such as railway equipment axles and the like, a support for the object to be tested; and electro-magnets arranged in axial alignment with the object beyond the ends of the latter and having cores which project beyond the inner ends of the magnet coils to an extent which will insure longitudinal traverse and concentration of the magnetic flux through the end portions of the object; and non-magnetizable supports for the magnets.

2. Magnetic testing apparatus according to claim 1, wherein the supports for the magnets are capable of relative adjustment to axially align the magnets and the object.

3. Magnetic testing apparatus according to claim 1, further including an electric circuit to which the coils of the magnets are connected for creation of magneto-motive forces which are additive.

4. Magnetic testing apparatus according to claim 1, in which the supports for the magnets are in the form of carriages capable of relative adjustment to axially align the magnets and the object; and further including a guide track of magnetizable material for the carriages constituting part of a return path for the magnetic flux.

5. In testing apparatus for flaw detection in elongate magnetizable objects such as railway equipment axles and the like, a support for the object to be tested; electro-magnets with their cores arranged in axial alignment with the object beyond the ends of the latter, non-magnetizable supports for the magnets; and anti-friction bearings respectively interposed between the inner ends of the magnet cores and the contiguous ends of the object to permit rotation of the latter during the testing without attendant restraint under the action of the magnetic flux.

6. Magnetic testing apparatus according to claim 5, in which each anti-friction bearing comprises groups of balls of magnetizable material, and a discous retainer for the ball groups connected to the inner end of the corresponding magnet core.

7. Magnetic testing apparatus according to claim 1, in which the areas of the inner ends of the magnet cores do not exceed the end face areas of the object.

8. In testing apparatus for flaw detection in elongate objects such as railway equipment axles and the like, a support for the object to be tested; electro-magnets arranged in axial alignment with the object beyond the opposite ends of the object; non-magnetic supports for the magnets; and a magnetic member in spaced parallel return flux relation to the object forming with the magnets, a magnetic yoke with interposition of air gaps between the outer ends of the magnets and the corresponding ends of said member.

9. Testing apparatus according to claim 8, wherein the magnets are provided with magnetic cores; and further including contact elements at the inner ends of the magnet cores which permit rotation of the object during the testing with compensation for off-squareness of the end faces of the object.

10. In testing apparatus for flaw detection in elongate objects such as railway equipment axles and the like, a pair of electro-magnets having coils and magnetic cores between which latter the object is placed in axial alignment, the inner end portions of the cores extending to a greater distance beyond the coils than the outer end portions; and non-magnetic supports for the magnets and the object.

11. In testing apparatus for flaw detection in elongate objects such as railway equipment axles and the like, electro-magnets arranged in axial alignment with the object beyond opposite ends thereof, the inner end portions of the cores of said magnets extending to a greater distance beyond the magnet coils than the outer end portions and being flared to terminal face areas somewhat smaller than the corresponding end face areas of the object, thereby forming, with the object, a low reluctance path for the magnetic flux; and a magnetic element in spaced parallel relation to the object forming, with air gaps between its ends and the corresponding outer end portions of the magnet cores, a high reluctance return path for the flux.

12. In testing apparatus for flaw detection in elongate objects such as railway equipment axles and the like, a pair of electro-magnets having coils and magnetic cores between which latter the object is placed in axial alignment, the inner end portions of the cores extending beyond the coils to a greater distance than the outer end portions and having enlarged terminal faces somewhat smaller in area than the corresponding end face areas of the object; and non-magnetic supports for the magnets and the object.

13. In testing apparatus for flaw detection in elongate objects such as railway equipment axles and the like, a pair of electro-magnets having coils and magnetic cores between which latter the object is placed in axial alignment, the inner end portions of said cores extending beyond the coils to a greater distance than the outer end portions and being outwardly flared to terminal faces whereof the areas are somewhat smaller than the corresponding end face areas of the object.

14. In testing apparatus for flaw detection in elongate objects such as railway equipment axles and the like, a pair of electro-magnets having coils and magnetic cores between which the object is placed in alignment; elements of magnetic material at the inner ends of the cores adapted to be contacted by the ends of the object and permitting rotation of the object during the testing; and non-magnetic supports for the magnets and the object.

15. Testing apparatus according to claim 13, wherein the inner end portions of the magnet cores extend to a greater distance beyond the magnet coils than their outer end portions.

16. Testing apparatus according to claim 13, wherein the inner end portions of the magnet cores extend beyond the magnet coils to a greater extent than the outer end portions and increase in cross section to terminal areas somewhat smaller than the corresponding end face areas of the object.

17. Testing apparatus according to claim 13, wherein the inner end portions of the magnet cores extend beyond the magnet coils to a greater extent than the outer end portions and are tapered for increase to terminal areas somewhat smaller than the corresponding end face areas of the object.

18. Testing apparatus according to claim 13, wherein the inner end portions of the magnet cores extend to a greater distance beyond the magnet coils than the outer end portions and have a greater total surface area than said outer end portions.

KARL E. HOFAMMANN.
SYLVESTER M. VIELE.

REFERENCES CITED

The following references are of record in the file of this patent:

UNITED STATES PATENTS

| Number | Name | Date |
| --- | --- | --- |
| 1,322,405 | Burrows | Nov. 18, 1919 |
| 1,426,384 | Hoke | Aug. 22, 1922 |
| 1,976,837 | DeLanty et al. | Oct. 16, 1934 |
| 2,061,692 | Bagley | Nov. 24, 1936 |
| 2,133,725 | Sperry et al. | Oct. 18, 1938 |
| 2,150,922 | Hay | Mar. 21, 1939 |
| 2,195,504 | Stone | Apr. 2, 1940 |
| 2,318,923 | Clark | May 11, 1943 |

OTHER REFERENCES

G. E. Review, vol. 45, No. 4, pages 210–213.